(12) United States Patent
Brandstrom

(10) Patent No.: US 9,302,353 B2
(45) Date of Patent: Apr. 5, 2016

(54) APPARATUS FOR CUTTING PIPE

(71) Applicant: Randel Brandstrom, Edmonton (CA)

(72) Inventor: Randel Brandstrom, Edmonton (CA)

(*) Notice: Subject to any disclaimer, the term of this patent is extended or adjusted under 35 U.S.C. 154(b) by 65 days.

(21) Appl. No.: 14/134,799

(22) Filed: Dec. 19, 2013

(65) Prior Publication Data

US 2015/0174661 A1    Jun. 25, 2015

(51) Int. Cl.
*B23K 37/00* (2006.01)
*B23K 37/053* (2006.01)
*B23K 20/26* (2006.01)
*B23K 37/02* (2006.01)

(52) U.S. Cl.
CPC .......... *B23K 37/0533* (2013.01); *B23K 20/26* (2013.01); *B23K 37/0276* (2013.01); *B23K 37/0288* (2013.01); *B23B 2215/72* (2013.01); *Y10T 82/16131* (2015.01)

(58) Field of Classification Search
None
See application file for complete search history.

(56) References Cited

U.S. PATENT DOCUMENTS

| | | | | |
|---|---|---|---|---|
| 1,879,346 A * | 9/1932 | Lawrence | | 266/56 |
| 1,879,444 A * | 9/1932 | Ost et al. | | 266/56 |
| 1,925,383 A * | 9/1933 | Hickey | | 266/57 |
| 1,981,340 A * | 11/1934 | Anderson | | 266/56 |
| 1,981,341 A * | 11/1934 | Anderson | | 266/56 |
| 1,998,729 A * | 4/1935 | Mathey et al. | | 266/56 |
| 2,242,448 A * | 5/1941 | Bucknam et al. | | 266/56 |
| 2,990,169 A * | 6/1961 | Wheeler | | 266/56 |
| 3,041,691 A * | 7/1962 | Vanier | | 414/746.3 |
| 3,176,897 A * | 4/1965 | Tucker | | 228/29 |
| 3,266,700 A * | 8/1966 | Bauer et al. | | 228/5.1 |
| 3,464,685 A * | 9/1969 | Schreib | | 266/56 |
| 3,575,364 A * | 4/1971 | Frederick | | 266/56 |
| 3,791,020 A * | 2/1974 | Babbitt | | 228/150 |
| 3,840,170 A * | 10/1974 | Arikawa et al. | | 228/29 |
| 4,010,346 A * | 3/1977 | Cecil et al. | | 219/124.34 |
| 4,039,115 A * | 8/1977 | Randolph et al. | | 228/44.5 |
| 4,219,370 A * | 8/1980 | Hoaglin et al. | | 148/196 |
| 4,235,137 A * | 11/1980 | Harman | | B23D 21/04 82/71 |
| 4,349,182 A * | 9/1982 | Blackburn | | B23K 7/005 219/124.33 |
| 4,480,821 A * | 11/1984 | Noll et al. | | 266/54 |
| 4,640,453 A * | 2/1987 | Oe | | B21C 37/123 228/145 |
| 4,683,788 A * | 8/1987 | Kronawittleithner | | B23B 5/16 82/19 |
| 4,824,007 A * | 4/1989 | Depaoli et al. | | 228/102 |
| 5,110,095 A * | 5/1992 | Dougal | | 266/55 |
| 5,180,095 A * | 1/1993 | Orth | | B21C 37/122 228/13 |
| 5,217,724 A * | 6/1993 | Lenters | | B23D 21/04 264/163 |

(Continued)

FOREIGN PATENT DOCUMENTS

GB    1399637 A  *  7/1975
GB    1427329 A  *  3/1976
WO   WO 2007110514 A1 * 10/2007

*Primary Examiner* — Kiley Stoner
(74) *Attorney, Agent, or Firm* — Adrian D. Battison; Ade & Company Inc.

(57) ABSTRACT

An apparatus for cutting pipe includes a central cutting station formed by a ring member carried on a support at the ground so as to be independent of the pipe with an in-feed conveyor apparatus on one side and an out-feed conveyor apparatus for on the other side. The ring member rotates around the axis of the pipe and carries in the rotation a camera, a cutting device and a welding head. The support assembly provides movement of the ring member transversely to and longitudinally of the axis of the pipe. The cutting head can be tilted to form a bevel on the pipe end. The apparatus is controlled by a control system for controlling rotation of the ring member and longitudinal movement of the support assembly so as to cut the pipe in selected directions for welding of the ends or for cutting pipe pups.

15 Claims, 4 Drawing Sheets

(56) References Cited

U.S. PATENT DOCUMENTS

| | | | |
|---|---|---|---|
| 5,323,949 A * | 6/1994 | Ruple et al. | 228/125 |
| 5,443,199 A * | 8/1995 | Krumszyn et al. | 228/29 |
| 5,673,843 A * | 10/1997 | Gainey | 228/44.5 |
| 5,685,996 A * | 11/1997 | Ricci | 219/121.39 |
| 5,894,771 A * | 4/1999 | Braun | B23B 5/14 82/113 |
| 6,495,792 B1 * | 12/2002 | Gysi | 219/121.63 |
| 7,918,380 B1 * | 4/2011 | Letzkus et al. | 228/156 |
| 8,642,914 B2 * | 2/2014 | Dupont et al. | 219/59.1 |
| 2002/0148333 A1 * | 10/2002 | Myers | 82/113 |
| 2004/0035171 A1 * | 2/2004 | Gormany | 72/125 |
| 2005/0103757 A1 * | 5/2005 | Gysi | B23K 15/006 219/121.64 |
| 2006/0163317 A1 * | 7/2006 | Wirth | 228/32 |
| 2007/0297556 A1 * | 12/2007 | Spencer et al. | 376/245 |
| 2008/0121628 A1 * | 5/2008 | Yamazaki et al. | 219/121.82 |
| 2008/0202299 A1 * | 8/2008 | Kudrus | 83/37 |
| 2008/0302769 A1 * | 12/2008 | Yamazaki et al. | 219/121.67 |
| 2010/0186564 A1 * | 7/2010 | Pierce | B23D 57/0007 83/72 |
| 2010/0301019 A1 * | 12/2010 | Vos et al. | 219/121.39 |
| 2010/0301103 A1 * | 12/2010 | Bonelli | 228/227 |
| 2012/0074631 A1 * | 3/2012 | Dagenais | 269/37 |
| 2013/0098220 A1 * | 4/2013 | Seminew | 83/861 |

\* cited by examiner

APPARATUS FOR CUTTING PIPE

This invention relates to an apparatus for cutting pipes which is particularly but not essentially direct to cutting pipes such as pipes that cannot be readily handled for manual cutting processes. This relates typically to pipes used in the oil and gas industry for transporting fluids, although pipes for any purpose can be cut using this apparatus.

The pipes can be cut using the apparatus both at ends of the pipe to shape the end in a radial plane or in other planes and shapes. The pipes can also be cut at an intermediate position on the pipe to cut a hole, slot or slit in the pipe for example for attachment of transverse pipes at a T-junction.

SUMMARY OF THE INVENTION

According to the invention there is provided an apparatus for cutting pipe comprising:

a cutting station;

an in-feed conveyor apparatus for feeding the pipe to be cut into the cutting station;

an out-feed conveyor apparatus for feeding the pipe after cutting from the cutting station;

the cutting station comprising a ring member for surrounding an axis of the pipe arranged outwardly around an exterior wall of the pipe;

the ring member being mounted for rotation around the axis of the pipe;

a cutting device mounted on the ring member for rotation with the ring member so as to provide cutting of the pipe;

a support assembly for supporting the ring member;

the support assembly being carried on a support surface independently of the pipe so as to be movable relative to the pipe;

the support assembly being arranged to provide movement of the ring member transversely to the axis of the pipe to locate the axis relative to the ring member;

the support assembly being arranged to provide movement of the ring member longitudinally of the axis of the pipe;

and a control system for controlling rotation of the ring member and longitudinal movement of the support assembly so as to cut the pipe in selected directions.

Preferably the cutting device is attached to the ring member by a support which can be tilted on the ring member so as to provide a cutting action in a plane at an angle to the radial plane of the axis of the pipe to form a bevel on the pipe.

Preferably the cutting device is attached to the ring member by a support which provides movement of the cutting device inwardly and outwardly of the axis of the pipe in the radial plane of the pipe.

Preferably the transverse movement of the ring member is vertical. However movement in other directions can be.

Preferably the ring member is supported or fixed or maintained by the support assembly in a plane radial to the axis of the pipe so that it does not twist out of that plane.

Preferably the ring member also carries a camera arranged to view the exterior wall of the pipe and also a welding head with the cutting device, the camera and the welding head arranged at angularly spaced positions around the ring member.

Preferably the in-feed conveyor apparatus comprises a roller or other longitudinally conveyor for feeding the pipe longitudinally and also includes a chuck for holding the pipe at a required position along the axis and for changing orientation of the pipe around the axis. This is provided particularly to maintain pipe orientation while moving the pipe to carry the next cut position of the pipe to the cutting head. The chuck can be located as an annular member around the pipe or can be at one end of the pipe.

In an alternative the in-feed conveyor is a driven roller conveyor for feeding the pipe longitudinally in which case the chuck may be omitted Preferably the out-feed conveyor apparatus comprises a driven roller conveyor co-linear with the conveyor of the in-feed conveyor apparatus.

Preferably the control system is arranged to provide cutting using the cutting device on the ring member of a first end of a first pipe, to provide cutting using the cutting device on the ring member of a second end of a second pipe, to move the second end of the second pipe to the first end of the first pipe and to cause welding of the first end to the second end using a welding head on the ring member. The welding system is of course optional and welding may be unnecessary or may be carried out at a separate station.

Preferably the cutting device can be tilted out of the radial plane so as to be arranged to cut the first and second ends at an angle to the radial plane of the first and second pipes so as to form a bevel thereon.

Preferably the control system is arranged to provide cutting using the cutting device on the ring member of a first pipe at longitudinally spaced portions of the first pipe so as to cut the first pipe into a plurality of pipe pups.

Preferably the out-feed conveyor includes a plurality of support arms for supporting the pipe pups.

The automated system as described in more detail hereinafter is divided into stations as follows:

a) The cutting station is used to cut the pipe to form pipe headers and to cut pipe pups to the desired length. The cutting station consists of a camera for measuring the part to be cut and a plasma cutter for cutting and beveling the part. The camera and cutter are mounted on a ring member carried on a support station for rotation of the camera and cutter around the axis of the pipe.

b) An in-feed apparatus comprises an in-feed chuck and in-feed conveyor. The in-feed conveyor is provided for material handling purposes only and is arranged to feed the pipe longitudinally into a cutting station. The in-feed chuck at one end of the conveyor is used for both material handling and rotation of the pipe for orientation of the pipe around its axis. The apparatus therefore allow the material to be moved into the plant and positioned at the cutting station in the correct location for cutting.

c) An out-feed conveyor arranged co-linear with the in-feed conveyor to cooperate therewith to position the material in the desired location for cutting. Both the in-feed and out-feed conveyors include free rollers along which the pipe can roll along its axis which allow for easy rotation powered by the chuck by which the weight of the pipe is carried on the conveyors and located by the chuck.

One purpose of the cutting station is to measure, cut, chamfer and weld together two lengths of pipe while arranged to minimise scrap. The ring member is mounted at the support station so that it is capable of traveling vertically to position the pipe in the center of the station. It also has 80 inches of linear travel along the pipe. The plasma cutter can be tilted into an angle relative to a radial plane of the axis of the pipe on the ring member to allow bevel cuts of the pipe typically at 45 degrees to the radial plane.

The station also can include an optional camera or proximity sensor which has the ability to precisely measure the orientation and location of the pipe. It is of course important to note that pipes are not always straight and are often non-circular. Thus the camera is firstly rotated around the pipe on the ring member to detect the position of the periphery of the pipe relative to the ring member. The camera is also used in conjunction with the feed mechanism of the chuck and in-feed conveyor to determine the length of the pipe currently in the in-feed system.

The station also includes a plasma torch which is a 3-axis cutting torch carried on a mount which gives it the ability to cut pipe straight, that is in the radial plane or at 45 degrees angle to the radial plane to form a bevel.

The mounting of the plasma cutter on the ring member carried on the movable support station also allows the cutter to cut holes in the pipe for connection of headers, where the holes may also include beveled for welded attachment to the headers. That is the cutter can be moved both radially of the pipe on the ting member and longitudinally of the pipe as the ring member is moved longitudinally to cut holes in the wall of the pipe which are of any required shape.

Using this set up the following procedure will be followed:

a) The pipe is measured for length and roundness using the in-feed conveyor, chuck and out-feed conveyor in conjunction with the camera or proximity sensor mounted on the ring member as the pipe is fed through the ring member.

b) Each section of the pipe to be joined is cut straight to ensure parallel faces, that is in an accurate radial plane of the pipe.

c) The pipe ends are then be bevel cut by tilting the cutter to the 45 degree angle in accordance with weld preparation procedure.

The proposed configuration provides the following benefits:

i) The pipe can be measured and cut in the one location;
ii) The same cutter can perform the bevel cuts;
iii) The cutter can cut straight or at 45 degree angle bevel;
iv) In a welding process where two pipe ends are connected, minimal scrap as ends are welded together.

The Cutting Station also can be used to cut a pipe into shorter lengths, typically called "pipe pups". These can of course be of any required length. However this operation will require a different set-up procedure. This may include a manual element for loading and unloading the pipe pups. For this purposes the pipe pups may be supported by extended arms from the out-feed conveyor. The cutting or pipe pups as short as 100 mm in length can be possible from a pipe approximately 1.5 m in length. Using this set up the procedure will be followed that the out-feed conveyor arm are manually extended by the operator. The operator should then retreat behind the safety curtain and reset the machine so that the pipe pups of the required length can be cut. The operator can then manually remove the pipe pups and repeat until desired number of pipe pups is reached.

BRIEF DESCRIPTION OF THE DRAWINGS

One embodiment of the invention will now be described in conjunction with the accompanying drawings in which.

In the drawings like characters of reference indicate corresponding parts in the different figures.

DETAILED DESCRIPTION

Figure 1:
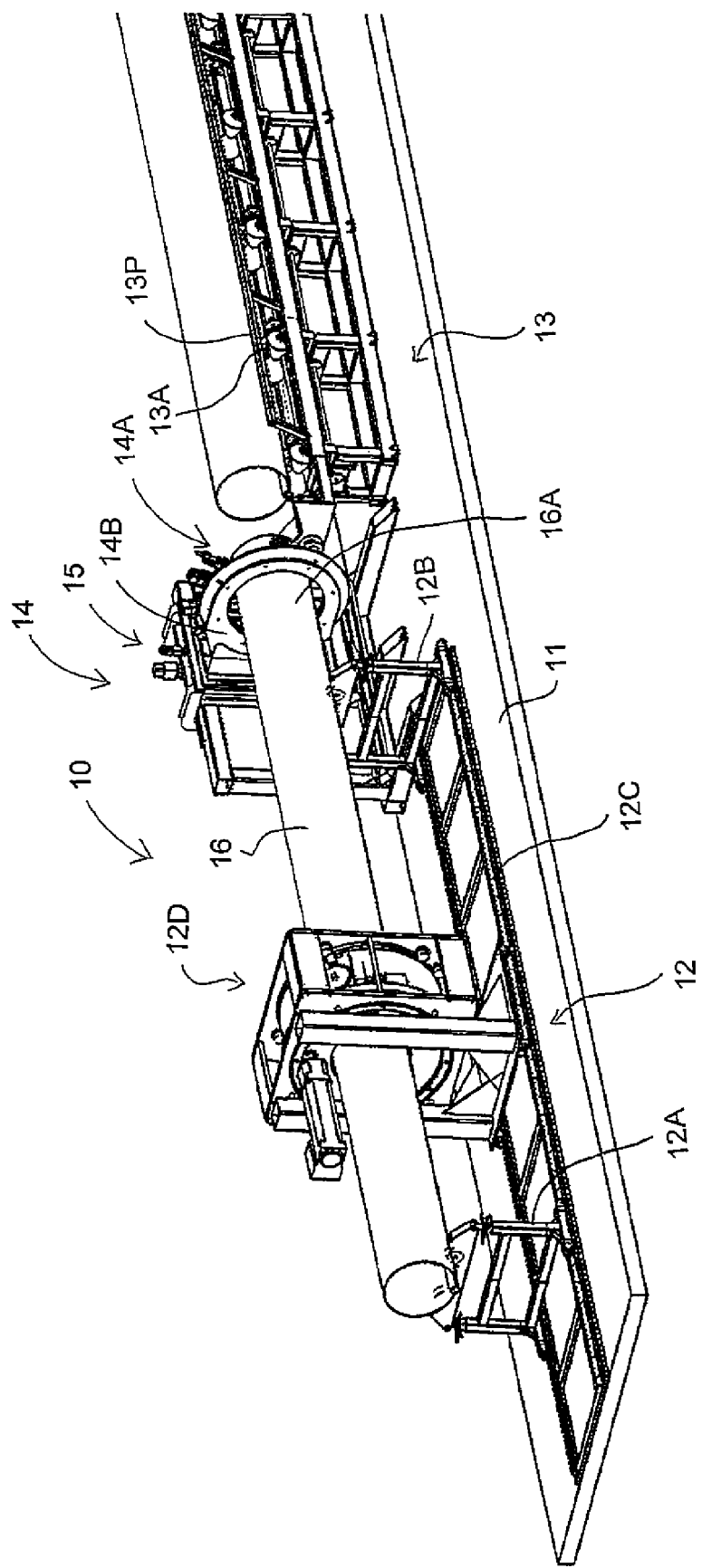
FIG. 1 is an isometric view of one embodiment of cutting apparatus according to the present invention.
Figure 2:
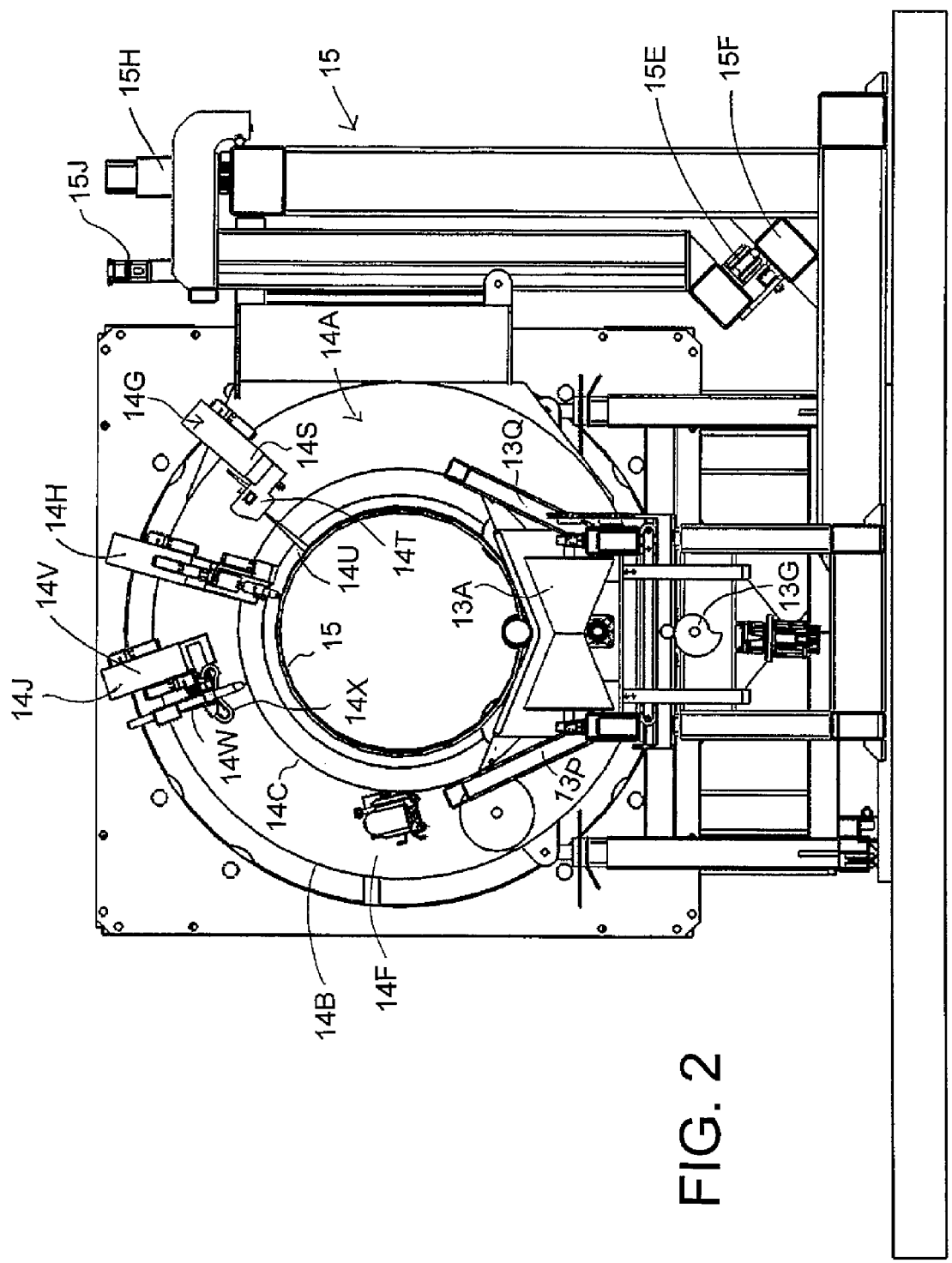
FIG. 2 is an end elevational view of the apparatus of FIG. 1 taken from the out-feed end.

As shown in the Figures there is provided an apparatus 10 for cutting pipe including a floor support surface 11 carrying an in-feed conveyor apparatus 12 for feeding the pipe to be cut into the cutting station, an out-feed conveyor apparatus 13 for feeding the pipe after cutting and a cutting station 14.

The cutting station 14 includes a ring member 14A having an outer edge 14B and an inner edge 14C surrounding an axis of a pipe 16 to be cut. The inner edge 14C is arranged outwardly around an exterior wall of the pipe so that the diameter is larger than the intended largest pipe to be cut.

The ring member is mounted for rotation around the axis of the pipe on a ring shaped support 14D coaxial with the ring member so that the support provides a bearing 14E to allow the ring member to rotate and a drive motor 14F which rotates a pinion which runs on a ring gear (not visible) around the ring member 14A.

The ring member carries at angularly spaced positions around the ring member on one face of the ring member 14A a camera 14G arranged to view the exterior wall of the pipe, a cutting head 14H and a welding head 14J.

The cutting device or head 14H is mounted on the ring member 14A for rotation with the ring member 14A so as to provide cutting of the pipe. The cutting head 14H has a main mounting portion 14K carried on a bracket on the ring with a slidable portion 14L movable radially of the axis of the pipe by a motor 14M. The slidable portion 14L carries the cutting torch 14N which can be tilted about an axis 14Q which is at right angles to the radial line from the axis so as to tilt the cutting torch. This allows the cutting device to be tilted on the ring member so as to provide a cutting action in a plane at an angle to the radial plane of the axis of the pipe to form a bevel on the pipe.

The camera 14G includes a camera module 14T carried on a mount 14S attached to a bracket on the ring 14A. The camera has a field of view 14U directed inwardly on to an outer face of the pipe within the ring 14A.

The welding head 14J has a welding torch 14W carried on a mount 14V mounted on a bracket on the ring 14A. The torch 14W can tilt on a support arc ember 14X so as to be advanced or retarded as it moves on the ring 14A around the pipe.

The fixed ring 14B is carried on a movable support assembly 15 for supporting the ring member including an inner frame 15A which can be lifted vertically on an outer frame 15B so adjust the position of the ring 14B relative to the axis of the pipe to accommodate larger and smaller pipes. The outer frame 15B can slide longitudinally of the axis on a main support 15C so as to move the ring longitudinally of the pipe. The main support includes a vertical frame carried on bottom legs 15D on the support surface 11. In this way the ring member is supported entirely independently of the pipe so as to be movable relative to the pipe while the pipe remains stationary or the pipe can be moved through the ring on the in-feed conveyor. The outer frame or carriage 15B is carried at the bottom on a roller 15E mounted on a horizontal rail 15F. At the upper end is provided a retainer portion 15G hooked over the main frame. Movement of the carriage is driven by a motor 15H driving a pinion on a rack 15K. Vertical movement of the inner frame 15A is operated by a slide 15M driven by a motor 15J.

As shown in FIG. 1, one option for the in-feed conveyor 12 is to provide a pair of supports 12A and 2B together with a chuck 12D all slidable with the pipe carried thereby along a track 12C on the surface 11. Thus the longitudinal position of the pipe 16 can be adjusted to move the end 16A of the pipe to a required position at the ring member.

Figure 3:
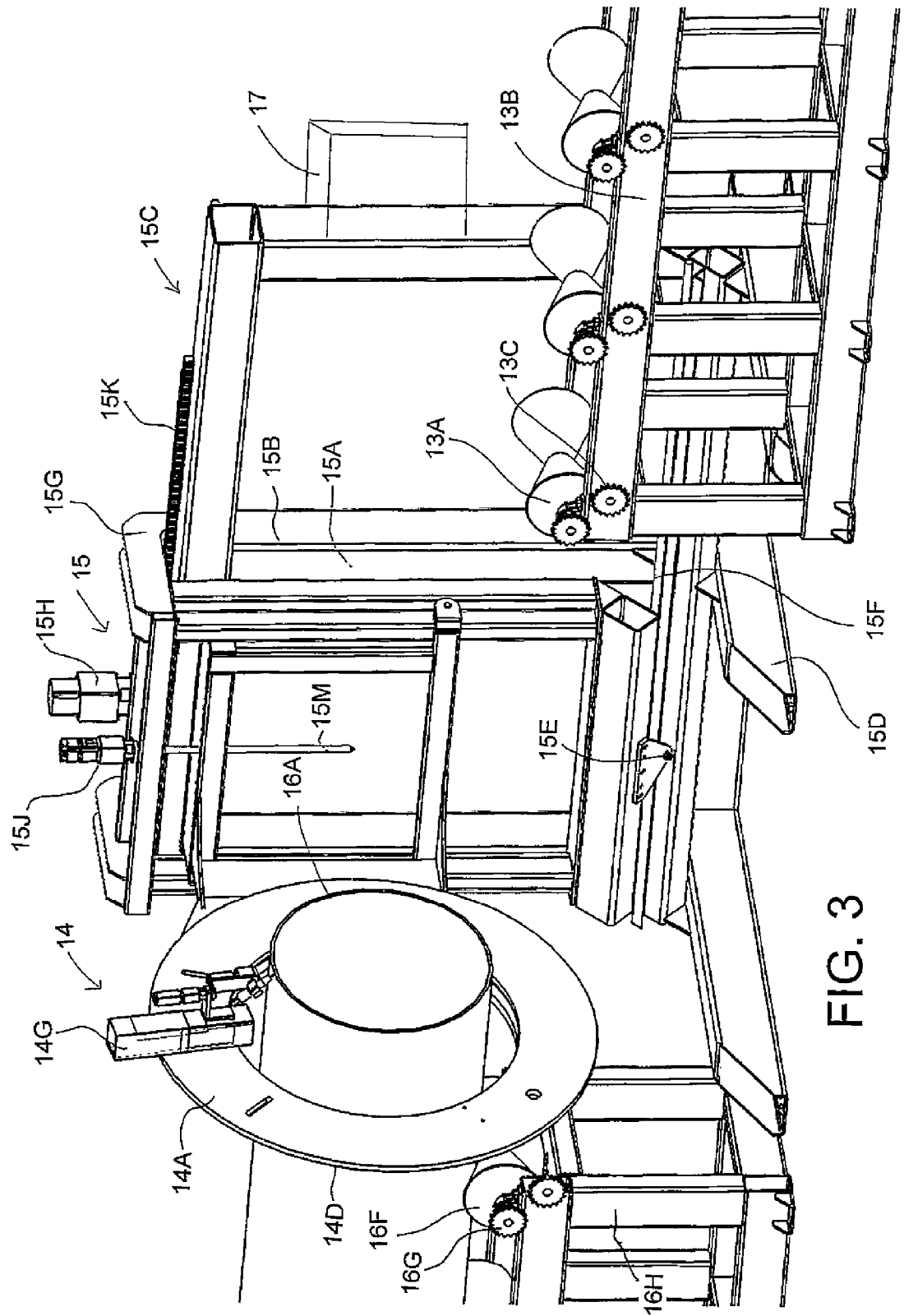
FIG. 3 is an isometric view of the apparatus of FIG. 1 showing the cutting station.
Figure 4:
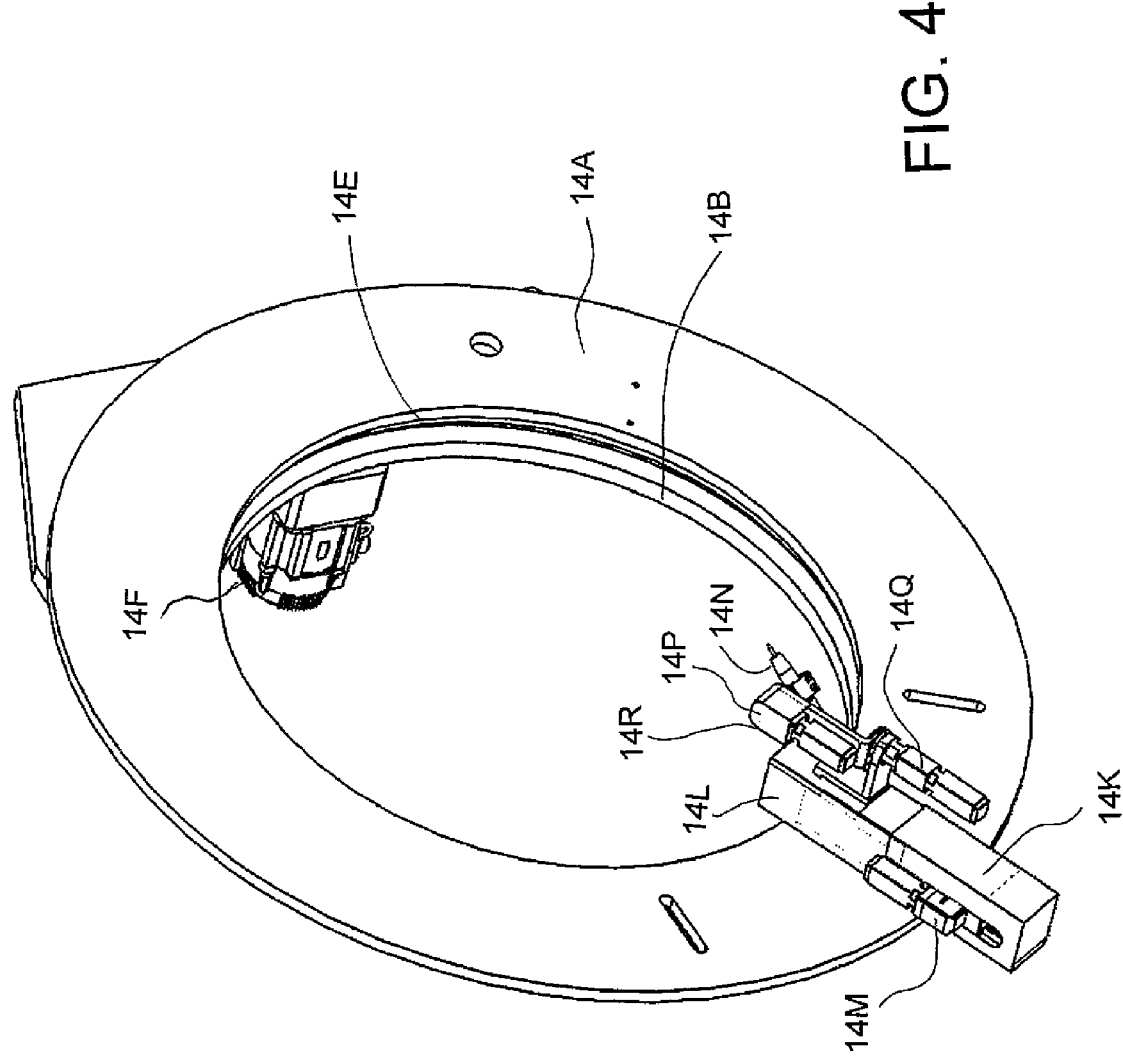
FIG. 4 is an isometric view of the ring member of FIG. 1.

As shown in FIG. 3, an alternative arrangement of the in-feed conveyor comprises a plurality of driven rollers 16F each driven around its axis by a drive system 16G and each carried on a fixed frame 16H.

The out-feed conveyor 13 comprises a plurality of rollers 13A mounted in a frame 13B again each driven around its axis by a drive system 13C. The height of the rollers 13A can be adjusted by raising a top section of the frame 13B by a scroll 13G so that the out-feed conveyor is axially aligned with the in-feed conveyor.

A control system 17 is provided for controlling drive to the various motors above in response to position signals from various sensors in the system. Thus in particular, rotation of the ring member and longitudinal movement of the support assembly can be accurately and simultaneously controlled so as to cut the pipe in selected directions. The control system 17 is arranged to carry out a cutting action at the first end 15A of a first pipe 15 using the cutting device 14H on the ring member. The same system can be used to provide cutting using the cutting device on the ring member of a second end of a second pipe. When both are cut, the in-feed and out-feed conveyors are controlled to move the second end of the second pipe up to the first end of the first pipe and the welding head on the ring member is operated to cause welding of the first end to the second end as the head is driven around the butting ends of the pies by the ring member.

In some cases the cutting device is arranged to cut the first and second ends at an angle to the radial plane of the first and second pipes as shown in FIG. 3 so as to form a bevel on each end and these bevelled ends are bought together to provide the weld line.

In an alternative operation the control system is arranged to provide cutting using the cutting device 14H on the ring member of the pipe 6 at longitudinally spaced portions of the first pipe so as to cut the first pipe into a plurality of pipe pups. As each cutting action is performed, the cut pipe pups are moved forwardly onto the out-feed conveyor and can be lifted off the rollers of that conveyor by lift arms 13P, 13Q for supporting the pipe pups and lifting them to one side for removal.

The rotation of the ring member and longitudinal movement of the support assembly as accurately and simultaneously controlled by the control system can be used so as to cut the pipe in selected directions to carry out the process of cutting holes and complex shapes in the side wall of the pipe or of cutting the end face of the pipe into complex shapes. That is the machine can be used not just as a cut-off machine but it also cuts profiles in or on the pipe or acts to form slits in the pipe.

Since various modifications can be made in my invention as herein above described, and many apparently widely different embodiments of same made within the spirit and scope of the claims without department from such spirit and scope, it is intended that all matter contained in the accompanying specification shall be interpreted as illustrative only and not in a limiting sense.

The invention claimed is:

1. Apparatus for cutting pipe comprising:
   a cutting station;
   an in-feed conveyor apparatus for feeding the pipe to be cut into the cutting station;
   an out-feed conveyor apparatus for feeding the pipe after cutting from the cutting station;
   the cutting station comprising a ring member for surrounding an axis of the pipe arranged outwardly around an exterior wall of the pipe;
   the ring member being mounted for rotation around the axis of the pipe;
   a cutting device mounted on the ring member for rotation with the ring member so as to provide cutting of the pipe;
   a support assembly for supporting the ring member;
   the support assembly being carried on a support surface independently of the pipe so as to be movable relative to the pipe;
   the support assembly being arranged to provide movement of the ring member transversely to the axis of the pipe to locate the axis relative to the ring member;
   the support assembly being arranged to provide movement of the ring member longitudinally of the axis of the pipe;
   and a control system for simultaneously controlling rotation of the ring member and longitudinal movement of the support assembly so as to cut the pipe in selected directions which include directions different from a radial plane of the axis of the pipe.

2. The apparatus according to claim 1 wherein the cutting device is attached to the ring member by a support which can be tilted on the ring member so as to provide a cutting action in a plane at an angle to the radial plane of the axis of the pipe to form a bevel on the pipe.

3. The apparatus according to claim 1 wherein the cutting device is attached to the ring member by a support which provides movement of the cutting device inwardly and outwardly of the axis of the pipe in the radial plane of the pipe.

4. The apparatus according to claim 1 wherein the transverse movement of the ring member is vertical.

5. The apparatus according to claim 1 wherein the ring member is maintained by the support assembly in a plane radial to the axis of the pipe.

6. The apparatus according to claim 1 wherein the ring member carries a camera arranged to view the exterior wall of the pipe.

7. The apparatus according to claim 1 wherein the ring member carries a welding head.

8. The apparatus according to claim 1 wherein the ring member carries a distance sensor arranged to detect the location of the exterior wall of the pipe and a welding head and wherein the cutting device, the sensor and the welding head are arranged at angularly spaced positions around the ring member.

9. The apparatus according to claim 1 wherein the in-feed conveyor apparatus comprises a conveyor for feeding the pipe longitudinally and a chuck for holding the pipe and for changing orientation of the pipe.

10. The apparatus according to claim 1 wherein the in-feed conveyor apparatus comprises a roller conveyor for feeding the pipe longitudinally.

11. The apparatus according to claim 9 wherein the out-feed conveyor apparatus comprises a conveyor co-linear with the conveyor of the in-feed conveyor apparatus.

12. The apparatus according to claim 1 wherein the control system is arranged to provide cutting using the cutting device on the ring member of a first end of a first pipe, to provide cutting using the cutting device on the ring member of a second end of a second pipe, to move the second end of the second pipe to the first end of the first pipe and to cause welding of the first end to the second end using a welding head on the ring member.

13. The apparatus according to claim 12 wherein the cutting device is arranged to cut the first and second ends at an angle to the radial plane of the first and second pipes so as to form a bevel thereon.

14. The apparatus according to claim 1 wherein the control system is arranged to provide cutting using the cutting device on the ring member of a first pipe longitudinally spaced portions of the first pipe so as to cut the first pipe into a plurality of pipe pups.

15. The apparatus according to claim 14 wherein the outfeed conveyor includes a plurality of support arms for supporting the pipe pups.

\* \* \* \* \*